(12) United States Patent
Hammelmaier et al.

(10) Patent No.: US 7,699,322 B2
(45) Date of Patent: Apr. 20, 2010

(54) STABILIZER ARRANGEMENT FOR A MOTOR VEHICLE

(75) Inventors: Ullrich Hammelmaier, Paderborn (DE); Metin Ersoy, Walluf (DE); Felix Haeusler, Osnabrueck (DE); Oliver Westphal, Brockum (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 512 days.

(21) Appl. No.: 11/569,534

(22) PCT Filed: May 20, 2005

(86) PCT No.: PCT/DE2005/000935

§ 371 (c)(1),
(2), (4) Date: May 9, 2007

(87) PCT Pub. No.: WO2005/113268

PCT Pub. Date: Dec. 1, 2005

(65) Prior Publication Data

US 2007/0267825 A1  Nov. 22, 2007

(30) Foreign Application Priority Data

May 24, 2004  (DE) ....................... 10 2004 025 807

(51) Int. Cl.
*B60G 17/005* (2006.01)
(52) U.S. Cl. .................................................. 280/5.502
(58) Field of Classification Search .............. 280/5.502, 280/5.506, 5.507, 5.508, 124.106, 124.157, 280/124.158, 124.161
See application file for complete search history.

(56) References Cited

U.S. PATENT DOCUMENTS

| 4,206,935 | A | | 6/1980 | Sheppard et al. | |
|---|---|---|---|---|---|
| 4,892,329 | A | * | 1/1990 | Kozaki et al. | 280/5.511 |
| 5,362,094 | A | * | 11/1994 | Jensen | 280/124.107 |
| 5,549,328 | A | * | 8/1996 | Cubalchini | 280/5.511 |
| 6,179,310 | B1 | * | 1/2001 | Clare et al. | 280/124.159 |

(Continued)

FOREIGN PATENT DOCUMENTS

DE  41 25 285  2/1993

(Continued)

*Primary Examiner*—Paul N Dickson
*Assistant Examiner*—Robert A Coker
(74) *Attorney, Agent, or Firm*—McGlew and Tuttle, P.C.

(57) ABSTRACT

A stabilizer arrangement for a motor vehicle has a stabilizer (1), which is connected to the vehicle chassis and which is connected to a spring-mounted wheel carrier part on each side of the vehicle by a piston-cylinder unit (4; 4') each. Each of the piston-cylinder units (4, 4') is formed of at least one piston (8, 8') arranged movably in a cylinder (7, 7'), and each is connected in an articulated manner, at one end, to one end of the stabilizer (1) and, at the other end, to a spring-mounted wheel carrier part. The piston-cylinder units (4, 4') are connected to a hydraulic pump (20). A stop (13, 13'), against which the respective piston (8, 8') can be moved, is assigned to each of the cylinders (7, 7'). By an arrangement of valves, it is made possible for the pistons (8, 8') to move out of each position in a purposeful manner against the stop (13, 13') and to hold there in a defined position in order to restore the stabilizer action in a purposeful manner and effectively from any position of the vehicle.

13 Claims, 5 Drawing Sheets

U.S. PATENT DOCUMENTS

| | | | |
|---|---|---|---|
| 6,206,383 B1 * | 3/2001 | Burdock | 280/5.508 |
| 6,254,108 B1 * | 7/2001 | Germain et al. | 280/5.506 |
| 6,520,510 B1 * | 2/2003 | Germain et al. | 280/5.511 |
| 6,533,294 B1 * | 3/2003 | Germain et al. | 280/5.511 |
| 6,575,484 B2 * | 6/2003 | Rogala et al. | 280/124.158 |

| | | |
|---|---|---|
| 2004/0090019 A1 | 5/2004 | Germain |

FOREIGN PATENT DOCUMENTS

| | | |
|---|---|---|
| EP | 1 000 782 A | 5/2000 |
| EP | 1 475 256 A1 | 11/2004 |

* cited by examiner

STABILIZER ARRANGEMENT FOR A MOTOR VEHICLE

CROSS REFERENCE TO RELATED APPLICATIONS

This application is a United States National Phase application of International Application PCT/DE 2005/000935 and claims the benefit of priority under 35 U.S.C. §119 of German Patent Application DE 10 2004 025 807.4 filed May 24, 2004, the entire contents of which are incorporated herein by reference.

FIELD OF THE INVENTION

The present invention pertains to a stabilizer arrangement for a motor vehicle, whereby an adjustable piston-cylinder unit, which is connected in an articulated manner to a spring-mounted wheel carrier part, is arranged at each of the ends of the stabilizer.

BACKGROUND OF THE INVENTION

In modern motor vehicles, soft chassis springs are used for a high driving comfort. In combination with correspondingly designed shock absorbers, such an improved ground contact is guaranteed in case of road unevennesses. The unfavorable increase in the rolling angle in curves which occurs in this case is compensated by the use of stabilizers, whereby the stabilizers are attached to the vehicle chassis and are connected in an articulated manner at the ends to a spring-mounted wheel carrier part, e.g., a suspension arm or a rigid axle via a rocker pendulum each. However, the possible axle twisting is reduced by the use of stabilizers, since they restrict an inward deflection in the opposite direction of the wheels of an axle. Therefore, it is especially desirable for off-road vehicles, so-called SUVs, to make it possible to influence the stabilizer function during off-road driving. This can be guaranteed by the use of switchable components, such that the wheels of an axle can deflect from one another independently. In this way, all wheels of the vehicle hold contact with the ground and can transmit propulsive forces.

There is a possibility of using switchable components in the use of hydraulically length-variable adjusting elements, such as, e.g., piston-cylinder units, instead of fixed rocker pendulums, as this is disclosed, e.g., in U.S. Pat. No. 4,206,935. The length-variable piston-cylinder units arranged between the stabilizer and the motor vehicle chassis are connected to one another by hydraulic lines, whereby the cylinder chamber facing towards the stabilizer and the cylinder chamber facing away from the stabilizer are each connected to one another via a hydraulic line each. A valve, which can block or release both hydraulic lines at the same time, is inserted into these hydraulic lines. If the hydraulic lines are blocked, the pistons of the piston-cylinder units are blocked, so that the stabilizer is able to transmit rolling motions of the vehicle to the other side of the vehicle. By contrast, if the hydraulic line is released, the pistons are able to move freely in the cylinders in case of rolling motions of the vehicle, such that the rolling motions cannot be absorbed by the stabilizer. In this case, hydraulic fluid flows from one piston-cylinder unit into the other.

The drawback of this arrangement is that, when the hydraulic lines are blocked, the pistons are not located in a defined and determinable position in the cylinders. Therefore, the stabilizer may be located outside of the structural position or fitting position, such that the driving properties are affected negatively.

Another arrangement for switchable rocker pendulums is used in the off-road vehicle Nissan Patrol. A coupling, consisting of a spring-loaded bolt on a piston, whereby the bolt meshes with a hole of the piston and thus blocks the piston, acts in this system of a piston-cylinder unit. If the coupling is released, the piston can move freely in the cylinder. The drawback of this embodiment is that the bolt only meshes with the hole when the bolt and hole are aligned with one another. The user has no effect on this. In the worst case, the vehicle travels without any stabilizer action in spite of the coupling being actuated. The driver does not receive any feedback in this system as to whether the piston is blocked.

SUMMARY OF THE INVENTION

Therefore, the object of the present invention is to create a stabilizer arrangement for a motor vehicle with switchable piston-cylinder units, which makes it possible to convert the stabilizer from an inactive state to an active state, whereby the piston-cylinder units and the stabilizer adopt a defined position for a safe driving state.

A stabilizer arrangement for a motor vehicle has a stabilizer, which is connected to the vehicle chassis and which is connected to a spring-mounted wheel carrier part on each side of the vehicle by means of a piston-cylinder unit. The piston-cylinder units includes at least one piston arranged movably in a cylinder and are connected in an articulated manner, at one end, to one end of the stabilizer and, at the other end, to the spring-mounted wheel carrier part. According to the present invention, the piston-cylinder units are, on the one hand, connected to a hydraulic pump and, on the other hand, provided with a stop, against which the piston can be moved. Furthermore, the respective first cylinder chamber arranged on the side of the piston facing away from the stop can be connected to the hydraulic pump via a hydraulic line, whereby a first valve each is provided between the respective first cylinder chamber and the hydraulic pump. At least one second valve is arranged on the side of the respective first valve facing away from the piston-cylinder unit and can be connected to the respective first valve via hydraulic lines. In a first switch position, the respective first valve blocks the flow from the respective first cylinder chamber in the direction of the hydraulic pump, whereas, in a second switch position, the flow is made possible by the valve in the direction to the respective first cylinder chamber and vice versa. In a first switch position, the at least one second valve prevents the flow from the respective first cylinder chamber of the piston-cylinder units in the direction of the respective second cylinder chamber arranged on the side of the piston facing towards the stop, whereas, in the second switch position of the at least one second valve, a connection can be made between the respective first cylinder chamber and the respective second cylinder chamber.

According to an advantageous embodiment, each first valve is designed as a 2/2-way valve that can be actuated electromagnetically, which in its first switch position, adopts the function of a nonreturn valve. This arrangement makes it possible for the pistons in the piston-cylinder unit to be able to move freely for an off-road drive, since an exchange of hydraulic fluid between each first cylinder chamber and the respective second cylinder chamber is made possible. Each first valve and the at least one second valve are located in their respective first switch position for this. The stabilizer does not perform any action during this switching. To restore the stabilizer action, the valves are switched in such a way that the hydraulic pump can deliver hydraulic fluid into the respective first cylinder chamber. The pistons move against a stop, forming a defined end position. The respective first valves and the at least one second valve are advantageously located in their respective second switch position. Due to the preferred design of the first switch position of the respective first valve as a nonreturn valve, which blocks a backflow from the respective first cylinder chamber in the direction of the hydraulic pump, the piston of the piston-cylinder unit is held in the position adjacent to the stop. Thus, the stabilizer is held in a fixed position, in which the stabilizer can perform its action, for example, for normal road travel, and can transmit forces or rolling motions from one side of the vehicle to the other. The stabilizer and the piston-cylinder units can thus be reliably converted from a freely movable position to a defined and fixed position, in which a safe driving behavior for road operation can be guaranteed. The moving of the piston against the stop and the restoration of the stabilizer function connected therewith are made possible with this arrangement in almost any position of the vehicle, i.e., even if the vehicle adopts an inclined position.

Advantageously, only one second valve is used, which acts jointly on both respective first valves and is connected to these first valves via a branching hydraulic line. The cost of the stabilizer arrangement is thus effectively reduced.

In another preferred embodiment, the second valve is designed as a 3/2-way valve, which blocks the flow from the hydraulic pump in the direction of the piston-cylinder units in the second switch position. By contrast, in the second switch position, it creates a connection between the respective first cylinder chamber and the respective second cylinder chamber, which connection is flowable in both directions, in conjunction with the second switch position of the respective first valve. A tank, which at the same time is also used as a reservoir for the pump, is advantageously arranged between the second valve and the respective second cylinder chamber.

In a preferred embodiment, the power steering pump of the motor vehicle can be used as a hydraulic pump, with which considerable space for components is saved. The power steering pump runs during the entire operation of the vehicle, as a result of which additional switching cost for a separate hydraulic pump is avoided. A pressure relief valve is advantageously used.

The present invention shall again be explained in greater detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
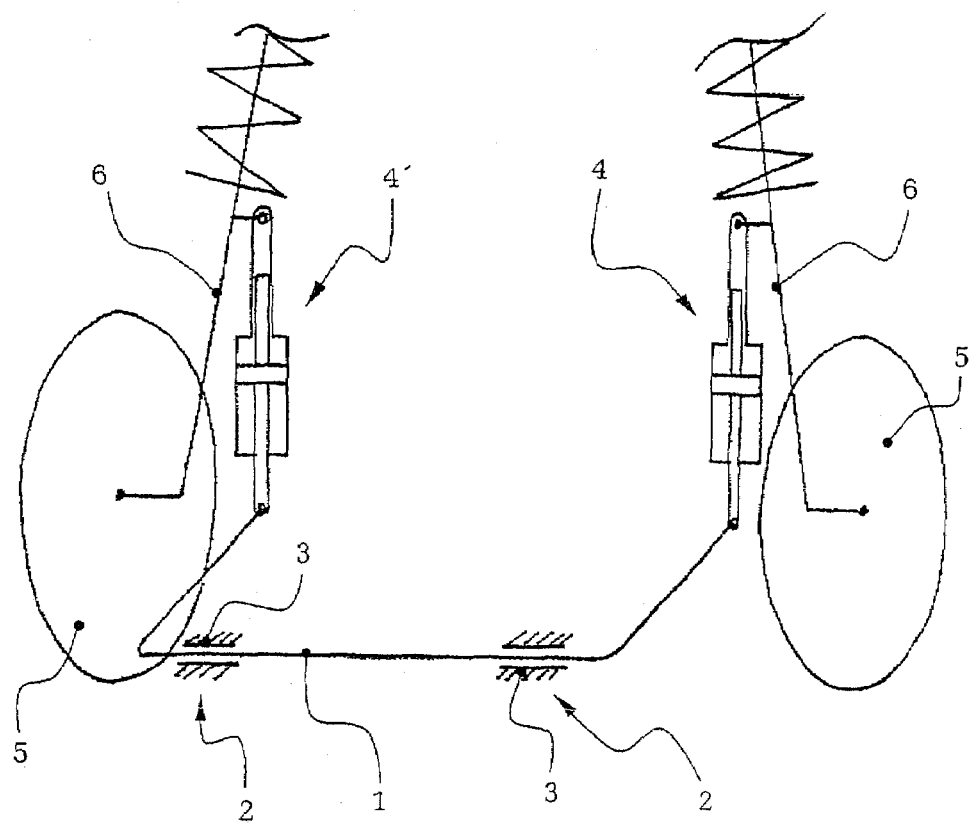
FIG. 1 is a schematic view of a stabilizer arrangement with piston-cylinder units for a motor vehicle.

Referring to the drawings in particular, FIG. 1 shows an exemplary schematic stabilizer arrangement, whereby a stabilizer 1 is pivotably held at a vehicle chassis in mounting points 2. At each of its ends, the stabilizer is connected to a piston-cylinder unit 4, 4' in an articulated manner. At its end facing away from the stabilizer 1, each piston-cylinder unit 4, 4' is connected, in an articulated manner, to a spring-mounted wheel carrier part, for example, to a shock absorber part 6 connected to a vehicle wheel 5.

Figure 2:
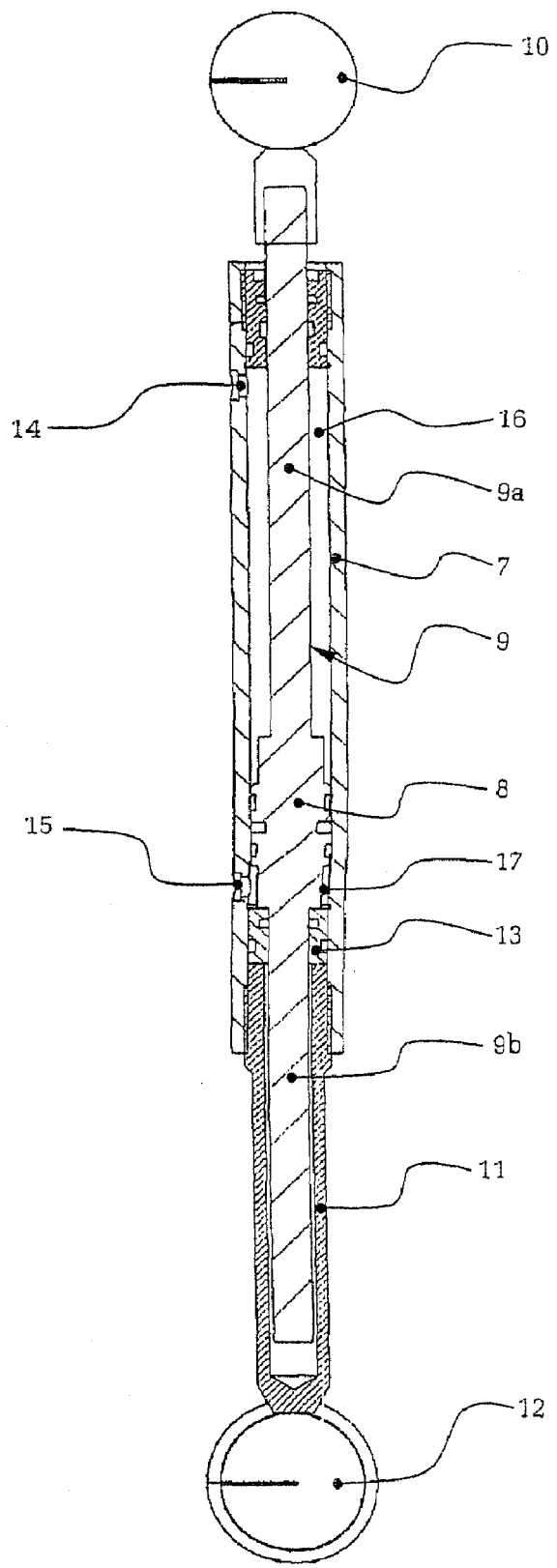
FIG. 2 is a sectional view of a piston-cylinder unit used according to the present invention.

The piston-cylinder units 4, 4' in this case replace rigid rocker pendulums and are, in this exemplary embodiment, advantageously designed as synchronous cylinders (cf. FIG. 2). A piston 8 arranged in a cylinder 7 has a two-sided piston rod 9, whereby the first piston rod side 9a protrudes from the cylinder 7 and is provided, at its end, with a mount 10 for connection in an articulated manner to the stabilizer 1. The second piston rod side 9b runs, with sufficient clearance, in a sleeve 11 arranged in the cylinder 7, and the sleeve 11 is advantageously screwed into the cylinder 7. At the end facing towards the shock absorber 6, the sleeve 11 is provided with another mount 12 for connection in an articulated manner to the shock absorber 6. Within the cylinder 7 is arranged a stop 13, against which the piston 8 can be moved, as this is shown in FIG. 2, whereby the stop can be fixed in the cylinders in a variety of ways that are known per se. In the cylinder 7 are arranged connecting holes 14, 15, to which hydraulic lines can be connected for impacting the piston 8 with a pressure. Via the connecting hole 14, a first cylinder chamber 16 is supplied with hydraulic fluid, whereas via the connecting hole 15, a second cylinder chamber 17, lying on the other side of the piston 8, is supplied with hydraulic fluid, such that the piston 8 can be impacted with a pressure from both sides. The first cylinder chamber 16 is arranged on the side of the piston 8 facing away from the stop 13 and the second cylinder chamber 17 is arranged on the side of the piston 8 facing towards the stop 13.

Figure 3:
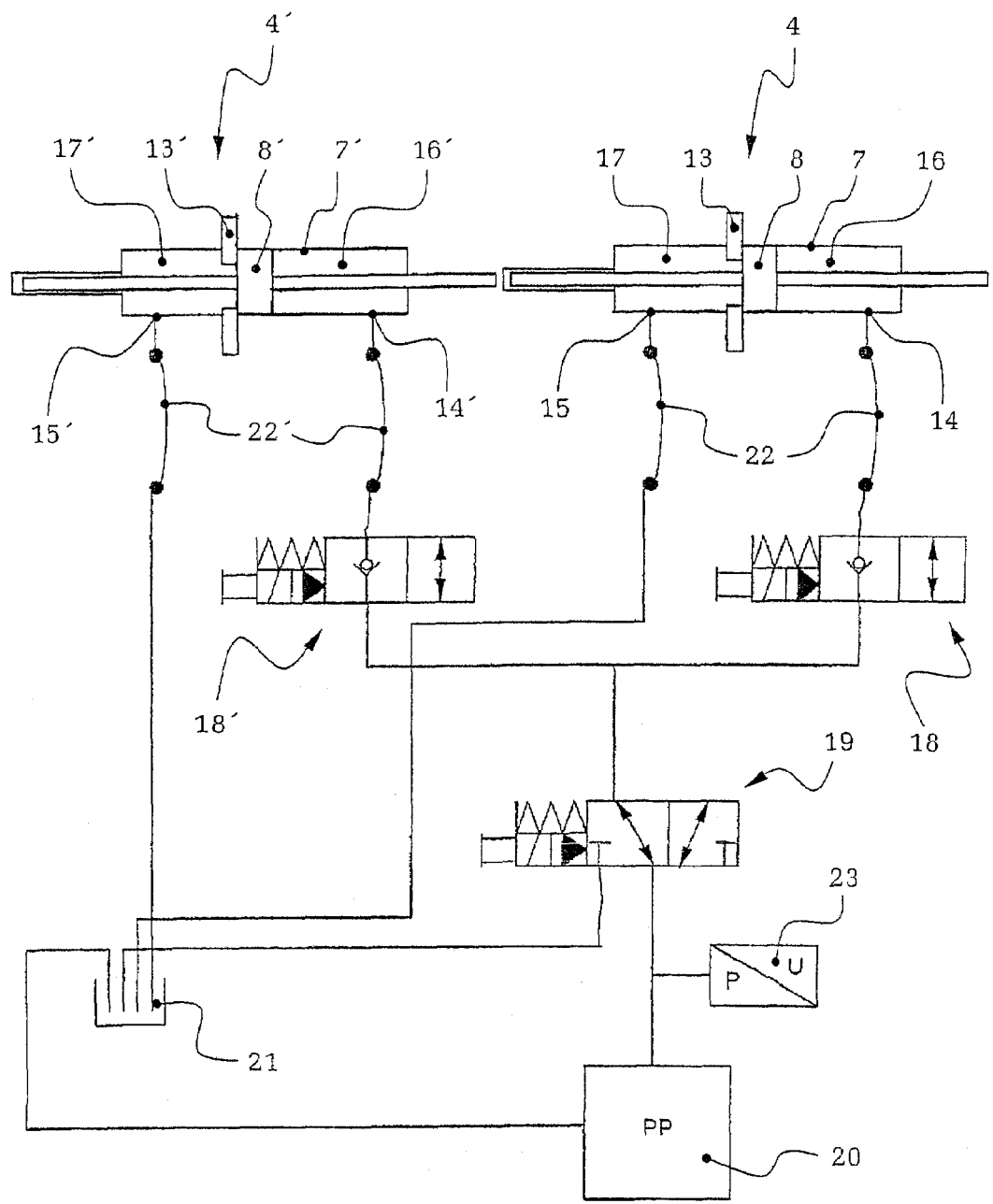
FIG. 3 is a hydraulic circuit diagram for a stabilizer arrangement according to the present invention with a switch position for road operation.

According to the hydraulic circuit diagram shown in FIG. 3, the piston-cylinder units 4, 4' are supplied with hydraulic fluid. The first cylinder chambers 16, 16' are each connected to a first 2/2-way valve 18, 18', which can be actuated electromechanically, via the connecting holes 14, 14' by means of a hydraulic line. On the side facing away from the piston-cylinder unit 4, 4', the 2/2-way valves 18, 18' are connected to a second 3/2-way valve 19, whereby the hydraulic lines exiting from the 2/2-way valves 18, 18' are brought together. For its part, the 3/2-way valve 19 is connected, on the side facing away from the piston-cylinder unit 4, 4', to a hydraulic pump 20, on the one hand, and to a tank 21, on the other hand. The continuously running power steering pump of the motor vehicle may be used as a hydraulic pump 20, as a result of which the cost and space requirement in the vehicle is considerably reduced.

The second cylinder chambers 17, 17' arranged on the side facing towards the stop 13, 13 are connected directly to the tank 21 via the connecting holes 15, 15' by means of hydraulic lines. The hydraulic lines exiting from the cylinders 7, 7' at the connecting holes 14, 14', 15, 15' have a flexible design for the compensation of motions of the cylinders 7, 7' in a section 22, 22'. Moreover, a pressure relief valve 23 is inserted into the hydraulic circuit.

In the view shown in FIG. 3, all of the valves 18, 18' and 19 are currentless, i.e., in their starting position and not switched; in this case, the 3/2-way valve 19, in this, its first, switch position, makes possible a flow from the hydraulic pump 20 in the direction of the piston-cylinder units 4, 4'. The hydraulic fluid can further reach the first cylinder chambers 16, 16' by means of the 2/2-way valves 18, 18' which are located in the likewise first switch position. Since the 2/2-way valves 18, 18' have the function of a nonreturn valve in this first switch position, no hydraulic fluid can, however, reach from the first cylinder chambers 16, 16' in the reverse direction, i.e., in the direction of the hydraulic pump 20 or of the tank 21. Thus, the pistons 8, 8', which in FIG. 3 rest in their starting positions at the stop 13, 13', do not move away from the respective stop 13, 13' into the respective first cylinder chambers 16, 16'. Thus, overall, the piston-cylinder units 4, 4' are rigid, as a result of which the stabilizer 1 can transmit forces or torques from one side of the vehicle to the other side of the vehicle. In this switch position, which is provided for road operation, a safe driving behavior can thus be guaranteed. The rolling motions can be minimized by the switched-on action of the stabilizer 1. Excess pressures, as they may occur due to the continuously running hydraulic pump 20 in this exemplary embodiment, are absorbed by the pressure relief valve 23.

Figure 4:
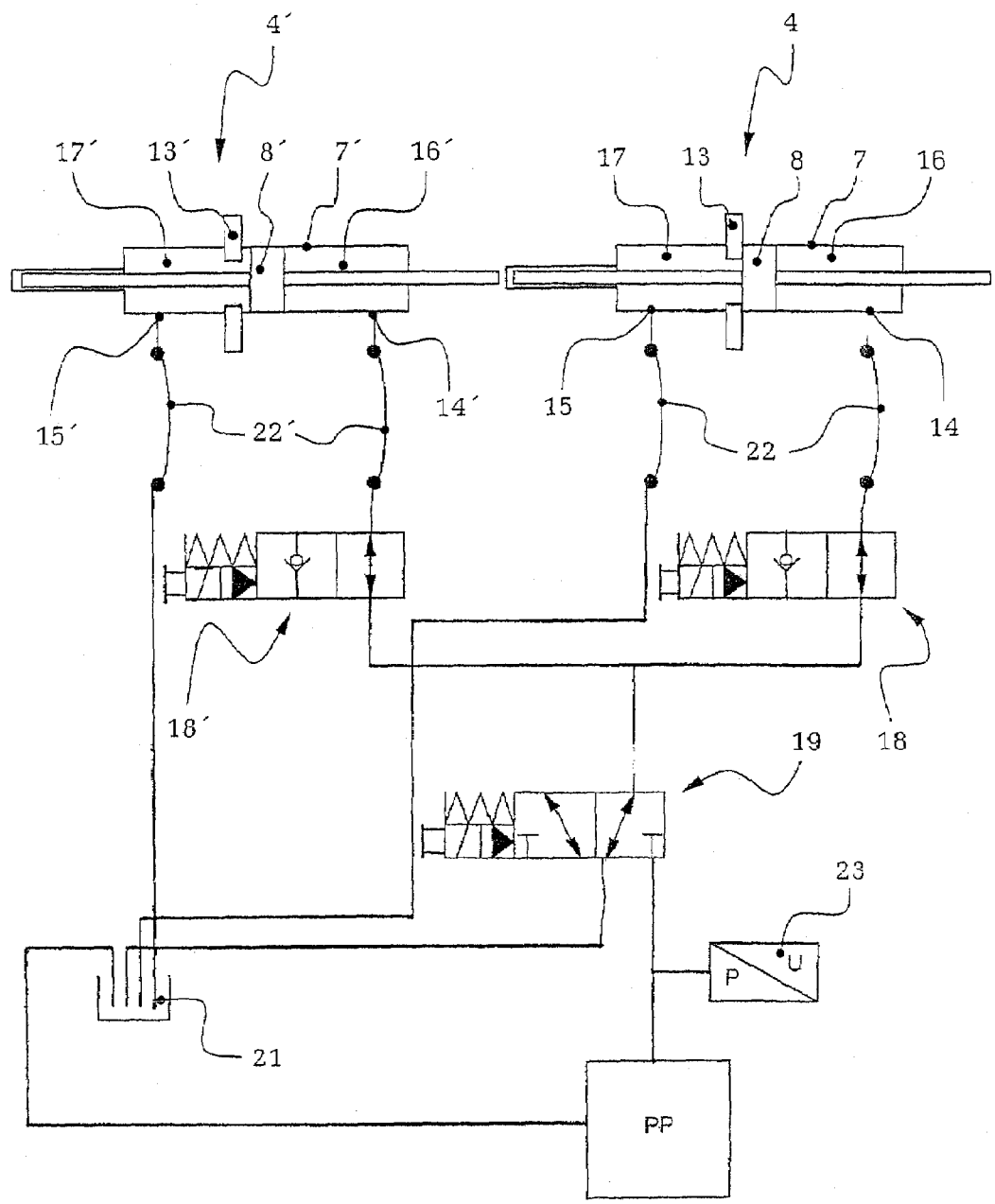
FIG. 4 is a hydraulic circuit diagram for a stabilizer arrangement according to the present invention with a switch position for off-road use.

An increased axle twisting is now necessary for off-road use, so that all wheels continuously have contact with the ground and thus a propulsion can be guaranteed. To this end, the 2/2-way valves 18, 18' and the 3/2-way valve 19 are supplied with current, i.e., switched on and thus brought into their respective second switch position. This is preferably done by the driver by means of a manual switching actuation from the vehicle interior. In this switch position of the way valves 18, 18' and 19 shown in FIG. 4, hydraulic fluid can flow through both the first 2/2-way valve 18, 18' and the second 3/2-way valve 19 in both directions. In this case, the 3/2-way valve 19 creates a connection of the respective second cylinder chambers 16, 16' to the tank 21. Thus, since the respective second cylinder chambers 17, 17' are connected to the tank, hydraulic fluid can now be exchanged between the first cylinder chambers 16, 16' and the second cylinder chambers 17, 17' in both directions. The pistons 8, 8' are thus freely movable in the respective cylinders 7, 7', and consequently the stabilizer action is neutralized and an increased axle twisting is made possible.

If the stabilizer action shall now be restored, all way valves 18, 18' and 19 are again switched off and moved into the respective first switch position according to FIG. 3. The continuously running hydraulic pump 20 in this exemplary embodiment now delivers hydraulic fluid into the respective first cylinder chambers 16, 16'. The pistons 8, 8' move in the cylinders 7, 7' in the direction of the stops 13, 13' until they rest against same and are held there because of the hydraulic pressure and of the hydraulic fluid, which does not flow back because of the nonreturn valve function of the 2/2-way valves 18, 18' in the first switch position. Consequently, the piston-cylinder units 4, 4' are fixed in an end position defined by the stops 13, 13', which end position represents the starting position for the road operation explained above with a switched-on stabilizer action (cf. FIG. 3). This conversion of the stabilizer arrangement from off-road operation to road operation is possible in almost any vehicle, i.e., even if the vehicle is in an inclined position.

Figure 5:
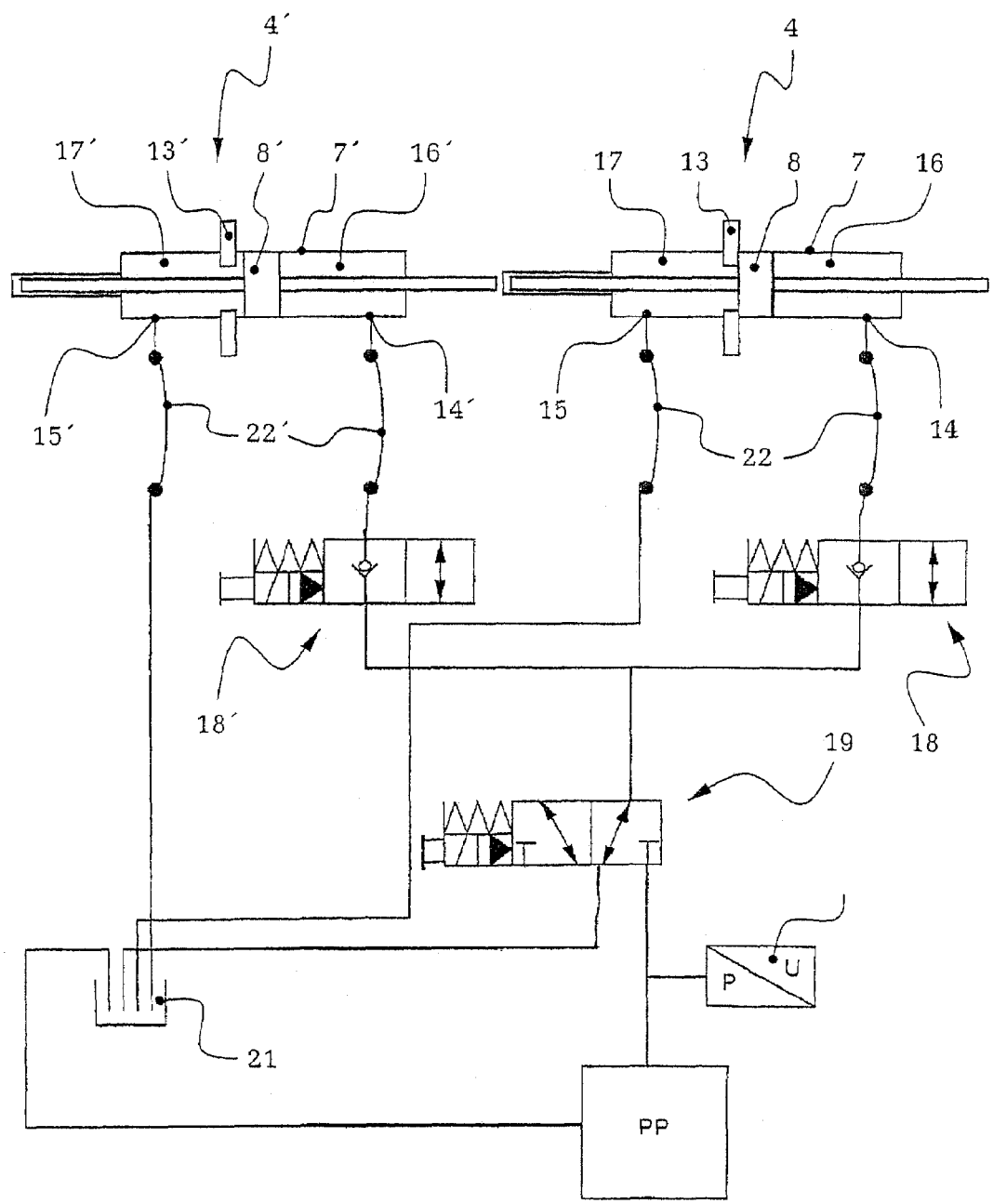
FIG. 5 shows a hydraulic circuit diagram for a stabilizer arrangement according to the present invention with a switch position for a fallback level.

When the stabilizer arrangement is in the switch position for off-road operation and the hydraulic pump 20 has failed, the stabilizer arrangement can again be returned to road operation with an effective stabilizer action via a so-called fallback level according to the view in FIG. 5. For this, only the 3/2-way valve 19 is manually switched by the driver. In this way, hydraulic fluid can reach the respective first cylinder chambers 16, 16' from the respective second cylinder chambers 17, 17', but not vice versa, since this is prevented by the nonreturn valve function of the 2/2-way valve 18, 18'. Thus, due to the motions during the travel, the pistons 8, 8' may also move in the direction of the respective stops 13, 13', but not away from them. Thus, due to the rolling motions of the vehicle the pistons 8, 8' may "swing" against the respective stops 13, 13' until the pistons 8, 8' rest against the stops 13, 13' and the piston-cylinder units 4, 4' are then fixed and a stabilizer action is present. The stabilizer arrangement is thus able to automatically convert from a voluntary off-road position of the piston-cylinder units 4, 4' to the starting position (road operation), in which the pistons 8, 8' are located in a defined position at the stop 13, 13'. The fallback level thus describes a limited function of the system in case the hydraulic pump 20 has failed.

In this embodiment, the piston-cylinder units 4, 4' can also be described as switchable rocker pendulums, since they are used instead of fixed rocker pendulums and can be switched on and off in their function. If the piston 8, 8' in the piston-cylinder unit 4, 4' is fixed against the stop 13, 13', the piston-cylinder units 4, 4' have the same function as fixed rocker pendulums.

Of course, the present invention is not limited only to this exemplary embodiment and may also be embodied in other ways. Thus, for example, a separate hydraulic pump may also be used instead of the continuously running power steering pump. This then makes possible an independent switching of the pump, since it does not have to run continuously. However, the switching cost is also consequently increased and additional space for components is needed, which is a drawback.

While specific embodiments of the invention have been shown and described in detail to illustrate the application of the principles of the invention, it will be understood that the invention may be embodied otherwise without departing from such principles.

The invention claimed is:

1. A stabilizer arrangement for a motor vehicle the stabilizer arrangement comprising:
   a stabilizer, which is connected to the vehicle chassis;
   piston-cylinder units, each of said piston-cylinder units including a piston arranged movably in a cylinder, and each of said piston-cylinder units being connected in an articulated manner, at one end, to one end of said stabilizer and, at the other end, to a spring-mounted wheel carrier part;
   a hydraulic pump, said piston-cylinder units being connected to said hydraulic pump;
   a stop associated with each said piston, against which a respective said piston can be moved, a respective first cylinder chamber being arranged on the side of said respective piston facing away from said stop and a respective second cylinder chamber being arranged on the side of said respective piston facing towards said stop, said first cylinder chamber being connected to said hydraulic pump via a hydraulic line;
   a first valve arranged between said respective first cylinder chamber and said hydraulic pump, said first valve, in a first switch position, blocking the flow from said, respective first cylinder chamber in the direction of said hydraulic pump and in a second switch position making possible a flow from said hydraulic pump in the direction of said respective first cylinder chamber and vice versa;
   a second valve arranged on the side of each said first valve facing away from said piston-cylinder unit, said second valve, in a first switch position, preventing the flow from said respective first cylinder chamber of said piston-cylinder units in the direction of said second cylinder chamber arranged on the side of said respective piston facing towards said stop, and in a second switch position, making possible a connection between said respective first cylinder chamber and said respective second cylinder chamber.

2. A stabilizer arrangement for a motor vehicle in accordance with claim 1, wherein said respective first valve is designed as a 2/2-way valve that can be actuated electromagnetically, which represents the function of a nonreturn valve in the first switch position.

3. A stabilizer arrangement in accordance with claim 1, wherein said at least one second valve is arranged between said respective first valve and said hydraulic pump, whereby, in the first switch position, a flow is made possible from said hydraulic pump in the direction of said piston-cylinder units.

4. A stabilizer arrangement for a motor vehicle in accordance with claim 1, wherein said at least one second valve is connected to both said first valves via a branching hydraulic line.

5. A stabilizer arrangement for a motor vehicle in accordance with claim 3, further comprising a tank, wherein said second valve is designed as a 3/2-way valve that can be actuated electromagnetically, which, in a second switch position, blocks the flow from said hydraulic pump in the direction of said piston-cylinder units and also makes possible the flow from said piston-cylinder units to said tank and vice versa.

6. A stabilizer arrangement for a motor vehicle in accordance with claim 1, wherein said hydraulic pump is the power steering pump of the motor vehicle.

7. A stabilizer arrangement for a motor vehicle in accordance with claim 1, wherein when said first valve and said second valve are in the respective first switch position, said respective pistons of said piston-cylinder units can be moved at the same time against said assigned stop.

8. A stabilizer arrangement for a motor vehicle in accordance with claim 1, wherein when said respective first valve and said at least one second valve are in the respective second switch position, said respective first cylinder chambers arranged on the side of said piston facing away from said stop can be connected to a respective second cylinder chamber arranged on the side of said piston facing towards said stop via the hydraulic lines and said tank.

9. A stabilizer arrangement for a motor vehicle in accordance with claim 1, wherein a pressure relief valve is provided in the hydraulic circuit.

10. A stabilizer arrangement for a motor vehicle in accordance with claim 1, wherein said first valve and another said first valve can be actuated together, but separately from said second valve.

11. A stabilizer arrangement in accordance with claim 9, wherein said valves can be actuated manually.

12. A stabilizer arrangement for a motor vehicle in accordance with claim 1, wherein said piston-cylinder units are designed as synchronous cylinders.

13. A motor vehicle stabilizer arrangement comprising:
a stabilizer connected to a vehicle chassis;
a hydraulic pump;
a first piston-cylinder unit with a first unit piston arranged movably in a first unit cylinder, said first piston-cylinder unit being articulated, at one end, to a first end of said stabilizer and articulated, at another end, to a spring-mounted wheel carrier part, said first piston-cylinder unit having a first unit stop, against which said first unit piston can be moved, and having a first unit first cylinder chamber arranged on a side of said first unit piston facing away from said first unit stop and having a first unit second cylinder chamber arranged on a side of said first unit piston facing towards said first unit stop, said first unit first cylinder chamber being connected to said hydraulic pump via a hydraulic line;
a second piston-cylinder unit with a second unit piston arranged movably in a second unit cylinder, said second piston-cylinder unit being articulated, at one end, to a second end of said stabilizer and articulated, at another end, to a spring-mounted wheel carrier part, said second piston-cylinder unit having a second unit stop, against which said second unit piston can be moved, and having a second unit first cylinder chamber arranged on a side of said second unit piston facing away from said second unit stop and having a second unit second cylinder chamber arranged on a side of said second unit piston facing towards said second unit stop, said second unit first cylinder chamber being connected to said hydraulic pump via a hydraulic line;
a first unit first valve arranged between said first unit first cylinder chamber and said hydraulic pump, said first unit first valve having a first switch position blocking flow from said first unit first cylinder chamber in a direction of said hydraulic pump and having a second switch position making possible a flow from said hydraulic pump in a direction of said first unit first cylinder chamber and vice versa;
a second unit first valve arranged between said second unit first cylinder chamber and said hydraulic pump, said second unit first valve having a first switch position blocking flow from said second unit first cylinder chamber in a direction of said hydraulic pump and having a second switch position making possible a flow from said hydraulic pump in a direction of said second unit first cylinder chamber and vice versa;
a second valve arranged on a side of each said first valve facing away from said piston-cylinder unit and having a first switch position, preventing flow from said first unit first cylinder chamber or from said second unit first cylinder chamber in the direction of said first unit second cylinder chamber or said second unit second cylinder chamber, and in a second switch position, making possible a connection between said first unit first cylinder chamber and said first unit second cylinder chamber or between said second unit first cylinder chamber and said second unit second cylinder chamber.

* * * * *